(12) United States Patent
Zhong et al.

(10) Patent No.: US 11,508,956 B2
(45) Date of Patent: Nov. 22, 2022

(54) DRY ELECTRODE MANUFACTURE WITH LUBRICATED ACTIVE MATERIAL MIXTURE

(71) Applicant: LiCAP Technologies, Inc., Sacramento, CA (US)

(72) Inventors: Linda Zhong, Sacramento, CA (US); Erika Shaw, Sacramento, CA (US); Bae Kyun Kim, Sacramento, CA (US)

(73) Assignee: LiCap Technologies, Inc., Sacramento, CA (US)

( * ) Notice: Subject to any disclaimer, the term of this patent is extended or adjusted under 35 U.S.C. 154(b) by 109 days.

(21) Appl. No.: 17/014,862

(22) Filed: Sep. 8, 2020

(65) Prior Publication Data

US 2022/0077453 A1 Mar. 10, 2022

(51) Int. Cl.
*H01M 10/0567* (2010.01)
*H01M 4/62* (2006.01)
(Continued)

(52) U.S. Cl.
CPC ......... *H01M 4/364* (2013.01); *H01M 4/0435* (2013.01); *H01M 4/139* (2013.01);
(Continued)

(58) Field of Classification Search
None
See application file for complete search history.

(56) References Cited

U.S. PATENT DOCUMENTS

| 4,216,045 A | 8/1980 | Morioka |
| 6,086,790 A | 7/2000 | Hayashi et al. |

(Continued)

FOREIGN PATENT DOCUMENTS

| CN | 1509481 A | 6/2004 |
| CN | 101313377 A | 11/2008 |

(Continued)

OTHER PUBLICATIONS

Decision for Grant of JP Application No. 2021-119484; dated Nov. 9, 2021.
(Continued)

*Primary Examiner* — Tracy M Dove
(74) *Attorney, Agent, or Firm* — Stetina Brunda Garred & Brucker (57) ABSTRACT

A method of manufacturing a free-standing electrode film includes preparing a mixture including an electrode active material, a binder, and an additive solution or conductive paste, the additive solution or conductive paste being in an amount less than 5% by weight of the mixture and including a polymer additive and a liquid carrier, as well as a conductive material in the case of a conductive paste. The mixture may have total solid contents greater than 95% by weight. Preparing the mixture may include mixing the additive solution or conductive paste with the electrode active material to lubricate the electrode active material and subsequently adding and mixing in the binder. The method may further include subjecting the mixture to a shear force and, after the mixture has been subjected to the shear force, pressing the mixture into a free-standing film.

21 Claims, 3 Drawing Sheets

(51) Int. Cl.
*H01M 4/04* (2006.01)
*H01M 4/139* (2010.01)
*H01M 4/36* (2006.01)
*H01M 4/66* (2006.01)

(52) U.S. Cl.
CPC .......... *H01M 4/621* (2013.01); *H01M 4/661* (2013.01); *H01M 10/0567* (2013.01)

(56) References Cited

U.S. PATENT DOCUMENTS

| | | |
|---|---|---|
| 6,667,000 B1 | 12/2003 | Nakazato et al. |
| 7,492,571 B2 | 2/2009 | Zhong et al. |
| 7,791,860 B2 | 9/2010 | Mitchell et al. |
| 7,935,155 B2 | 5/2011 | Mitchell et al. |
| 2004/0164440 A1 | 8/2004 | Ozaki et al. |
| 2005/0250011 A1 | 11/2005 | Mitchell et al. |
| 2005/0266298 A1 | 12/2005 | Mitchell et al. |
| 2006/0078798 A1 | 4/2006 | van Heuveln et al. |
| 2008/0089006 A1 | 4/2008 | Zhong et al. |
| 2008/0201925 A1 | 8/2008 | Zhong et al. |
| 2009/0223630 A1 | 9/2009 | Mitchell et al. |
| 2009/0290288 A1 | 11/2009 | Mitchell et al. |
| 2009/0294081 A1 | 12/2009 | Gadkaree et al. |
| 2009/0321678 A1 | 12/2009 | Zhong et al. |
| 2010/0014215 A1 | 1/2010 | Zhong et al. |
| 2011/0287305 A1 | 11/2011 | Scordilis-Kelley et al. |
| 2013/0255872 A1 | 10/2013 | Zhong |
| 2016/0099461 A1 | 4/2016 | Kishimoto |
| 2018/0175366 A1 | 6/2018 | Zheng et al. |
| 2018/0277847 A1 | 9/2018 | Saidi |
| 2020/0395614 A1* | 12/2020 | Liu ........................... C08F 2/44 |
| 2021/0002496 A1* | 1/2021 | Kory ..................... H01M 4/133 |

FOREIGN PATENT DOCUMENTS

| | | |
|---|---|---|
| CN | 102324317 A | 1/2012 |
| EP | 1923895 A1 | 5/2008 |
| EP | 2082407 B1 | 11/2015 |
| GB | 1421514 | 1/1974 |
| JP | 50013843 A | 2/1975 |
| JP | 3793751 B2 | 7/2006 |
| JP | 2017517862 A | 6/2017 |
| JP | 2017532737 A | 11/2017 |
| JP | 2020196887 A | 12/2020 |
| JP | 2021519495 A | 8/2021 |
| KR | 1020060118023 A | 11/2006 |
| KR | 1020190129969 A | 11/2019 |
| UA | 83075 C2 | 6/2008 |
| WO | 2016210419 A1 | 12/2016 |

OTHER PUBLICATIONS

Extended European Search Report for Application No. 201185758.6; dated Jan. 5, 2022.
International Search Report dated May 3, 2013 for PCT/US2013/028220 (6 pages).
Extended European Search Report for Application No. 13767354.7 dated Nov. 18, 2015 (11 pages).
Korean Office Action for KR 10-2021-0109185; dated Apr. 13, 2022.
Chinese Office Action for Chinese Patent Application No. 2021109247156; dated Aug. 31, 2022.

* cited by examiner

DRY ELECTRODE MANUFACTURE WITH LUBRICATED ACTIVE MATERIAL MIXTURE

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to manufacturing electrodes for energy storage devices such as batteries and Li-ion capacitors and, more particularly, to the manufacture of a free-standing electrode film by a dry process.

2. Related Art

As demand for inexpensive energy storage devices increases, various methods have been proposed for manufacturing electrodes. Among these, there exist so-called "dry" processes by which a free-standing electrode film may be manufactured while avoiding the expense and drying time associated with the solvents and aqueous solutions that are typically used in slurry coating and extrusion processes. In order to produce higher quality electrodes by such a dry process that may result in energy storage devices having higher energy density, the amount of binder mixed with the active material should be minimized within a range that still allows for an electrode film to be reliably produced without excessive breakage. To this end, the binder may be chemically activated to improve its adhesion strength by the addition of a highly vaporizable solvent as described in the present inventor's own U.S. Pat. No. 10,069,131, entitled "Electrode for Energy Storage Devices and Method of Making Same," the entirety of the disclosure of which is wholly incorporated by reference herein. However, further reduction in the amount of binder needed is desirable, especially in the case of producing electrodes for batteries, whose active materials may require more binder than those of ultracapacitors and other energy storage devices.

One method for further reducing the amount of binder needed is by temperature activation of the binder, either alone or in combination with chemical activation, as described in the present inventor's own U.S. patent application Ser. No. 16/874,502, filed May 14, 2020 and entitled "Dry Electrode Manufacture by Temperature Activation Method," the entirety of the disclosure of which is wholly incorporated by reference herein. Active material loading and the electrode film quality improves significantly by a combination of chemical activation and/or temperature activation when making battery electrodes using the dry method.

Despite the above improvements, higher active loading formulations and better electrode quality remains desirable.

BRIEF SUMMARY

The present disclosure contemplates various methods for overcoming the drawbacks accompanying the related art.

One aspect of the embodiments of the present disclosure is a method of manufacturing a free-standing electrode film. The method may comprise preparing a mixture including an electrode active material, a binder, and an additive solution, the additive solution being in an amount less than 5% by weight of the mixture and including a polymer additive and a liquid carrier, the mixture having total solid contents greater than 95% by weight. The preparing of the mixture may comprise mixing the additive solution with the electrode active material to lubricate the electrode active material and subsequently adding and mixing in the binder. The method may further comprise subjecting the mixture to a shear force and, after the mixture has been subjected to the shear force, pressing the mixture into a free-standing film.

The method may comprise mixing the polymer additive with the liquid carrier to produce the additive solution.

The polymer additive may be 0.5-10% by weight of the additive solution. The polymer additive may be 1-5% by weight of the additive solution.

The mixture may include a conductive material. The preparing of the mixture may comprise mixing the additive solution with the electrode active material to lubricate the electrode active material and subsequently adding and mixing in the binder and the conductive material.

The pressing of the mixture into a free-standing film may include applying a roller press to the mixture.

Another aspect of the embodiments of the present disclosure is a method of manufacturing a free-standing electrode film. The method may comprise preparing a mixture including an electrode active material, a binder, and a conductive paste, the conductive paste being in an amount less than 5% by weight of the mixture and including a polymer additive, a liquid carrier, and a conductive material, the mixture having total solid contents greater than 95% by weight. The preparing of the mixture may comprise mixing the conductive paste with the electrode active material to lubricate the electrode active material and subsequently adding and mixing in the binder. The method may further comprise subjecting the mixture to a shear force and, after the mixture has been subjected to the shear force, pressing the mixture into a free-standing film.

The method may comprise mixing the polymer additive, the liquid carrier, and the conductive material to produce the conductive paste. The mixing of the polymer additive, the liquid carrier, and the conductive material to produce the conductive paste may comprise mixing the polymer additive and the liquid carrier to produce an additive solution and, thereafter, mixing the conductive material into the additive solution. The polymer additive may be 0.5-10% by weight of the additive solution. The polymer additive may be 1-5% by weight of the additive solution.

The conductive material may be 1-20% by weight of the conductive paste. The conductive material may be 2-15% by weight of the conductive paste. The conductive material may be 5-10% by weight of the conductive paste.

The mixture may include a second conductive material other than the conductive material included in the conductive paste. The preparing of the mixture may comprise mixing the conductive paste with the electrode active material to lubricate the electrode active material and subsequently adding and mixing in the binder and the second conductive material.

The pressing of the mixture into a free-standing film may include applying a roller press to the mixture.

Another aspect of the embodiments of the present disclosure is a method of manufacturing an electrode. The method may comprise performing either of the above methods and laminating the resulting free-standing film on a current collector.

Another aspect of the embodiments of the present disclosure is a powdery mixture for use in manufacturing a free-standing electrode film. The powdery mixture may comprise an electrode active material, a binder, and an additive solution in an amount less than 5% by weight of the powdery mixture, the additive solution including a polymer additive and a liquid carrier. The powdery mixture may have total solid contents greater than 95% by weight.

The powdery mixture may further comprise a conductive material.

BRIEF DESCRIPTION OF THE DRAWINGS

The above and other features and advantages of the various embodiments disclosed herein will be better understood with respect to the following description and drawings, in which like numbers refer to like parts throughout, and in which.

DETAILED DESCRIPTION

The present disclosure encompasses various embodiments of methods and mixtures for manufacturing a free-standing electrode film or an electrode produced therefrom, as well as the resulting films, electrodes, and energy storage devices. The detailed description set forth below in connection with the appended drawings is intended as a description of several currently contemplated embodiments and is not intended to represent the only form in which the disclosed invention may be developed or utilized. The description sets forth the functions and features in connection with the illustrated embodiments. It is to be understood, however, that the same or equivalent functions may be accomplished by different embodiments that are also intended to be encompassed within the scope of the present disclosure. It is further understood that the use of relational terms such as first and second and the like are used solely to distinguish one from another entity without necessarily requiring or implying any actual such relationship or order between such entities.

Figure 1:
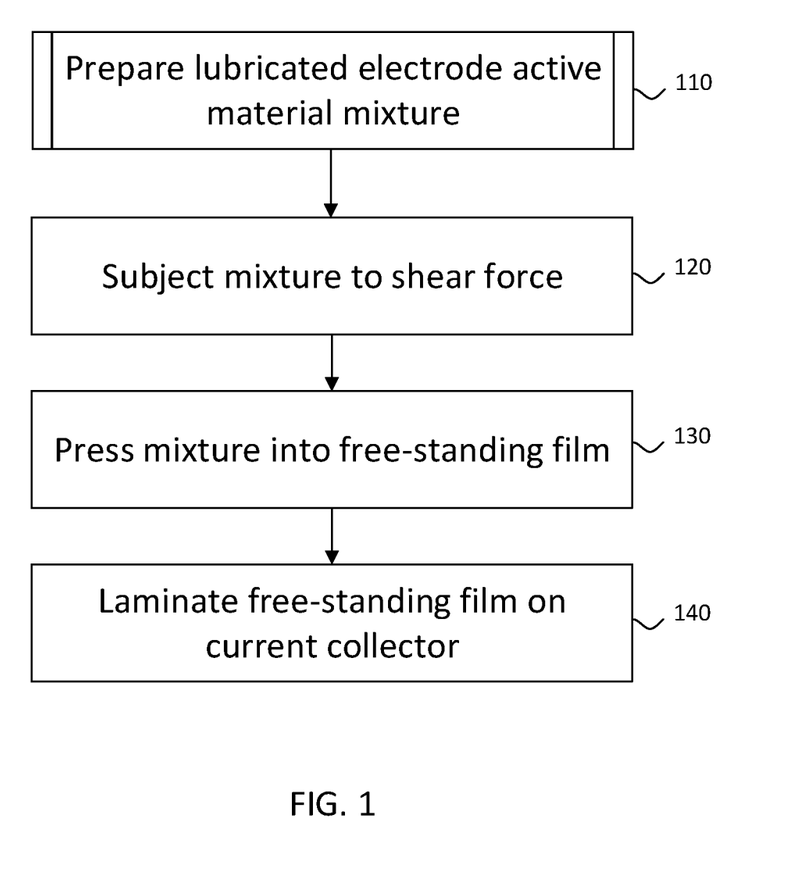
FIG. 1 shows an example operational flow for manufacturing a free-standing electrode film or an electrode produced therefrom.

FIG. 1 shows an operational flow for manufacturing a free-standing electrode film or an electrode produced therefrom. Unlike conventional dry processes, the process exemplified by FIG. 1 includes the lubrication of the active material mixture that will be pressed into a free-standing film. This may be achieved by mixing a polymer-containing additive solution or conductive paste with the electrode active material prior to adding a binder, as shown by way of example in the operational flows of FIGS. 2 and 3 (which represent sub-processes of step 110 in FIG. 1). The resulting powdery mixture may be pressed into a free-standing electrode film of superior quality, allowing for lower binder content and higher active loading formulations. As a result, the disclosed processes can produce an energy storage device with improved discharge characteristics including higher discharge capacity, higher first cycle efficiency, and higher C rate.

Figure 2:
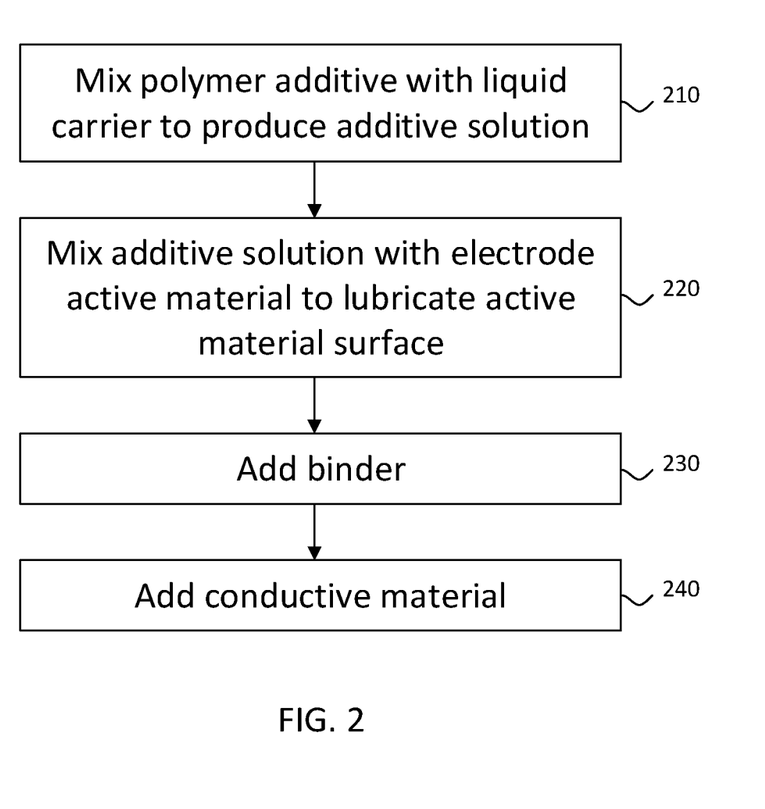
FIG. 2 shows an example sub-process of step 110 in FIG. 1.

The operational flow of FIG. 1 may begin with a step 110 of preparing a lubricated electrode active material mixture. Referring by way of example to FIG. 2, which shows an example sub-process of step 110, the active material mixture may be lubricated by the addition of an additive solution. First, in step 210, the additive solution may be produced by mixing a polymer additive with a liquid carrier. The polymer additive may be a polymeric compound, surfactant or high viscosity liquid (e.g. mineral oil or wax) such as those known to be used as a dispersant for carbon nanotubes or as a binder. See, for example, U.S. Pat. No. 8,540,902, which provides example dispersants and polymeric binders including polyethylene, polypropylene, polyamide, polyurethane, polyvinyl chloride, polyvinylidene fluoride, thermoplastic polyester resin, polyvinylpyrrolidone, polystyrene sulfonate, polyphenylacetylene, polymetaphenylenevinylene, polypyrrole, polyp-phenylene benzobisoxazole, natural polymers, amphiphilic materials in aqueous solutions, anionic aliphatic surfactant, sodium dodecyl sulfate, cyclic lipopeptido bio surfactant, water-soluble polymers, polyvinyl alcohol sodium dodecyl sulfate, polyoxyethylene surfactant, polyvinylidene fluoride (PVDF), carboxyl methyl cellulose (CMC), hydroxyl ethyl cellulose polyacrylic acid, polyvinyl chloride and combinations thereof. Another example polymer additive may be styrene-butadiene rubber (SBR).

The present disclosure contemplates the use of one or more of such polymers as an additive to lubricate the electrode active material. Thus, whereas these compounds may conventionally be added to a wet mixture (e.g. a solution containing a large quantity of a solvent such as n-methylpyrrolidone) to function as a carbon nanotube dispersant or a binder when producing an electrode by a coating method as exemplified by U.S. Pat. No. 8,540,902, the processes of the present disclosure introduce the polymer additive as a way of lubricating a predominantly dry or powdery mixture using only a small amount of a liquid carrier (e.g. less than 5% by weight of the mixture). The lubricating effect of the polymer additive is found to improve the quality of the resulting free-standing film in the disclosed dry electrode manufacturing process, making it possible to use less binder and thus more active material.

The liquid carrier used to produce the additive solution may be aqueous or non-aqueous and may, for example, include one or more chemicals selected from the group consisting of n-methylpyrrolidone, a hydrocarbon, an acetate ester, an alcohol, a glycol, ethanol, methanol, isopropanol, acetone, diethyl carbonate, and dimethyl carbonate. The liquid carrier may be chosen for its ability to dissolve the polymer additive and for its vaporization temperature, which may be at or higher than 70° C., for example. The polymer additive may be mixed with the liquid carrier using any type of mixing tool, such as a hand mixer, a blender, or an industrial mixer, until the polymer additive is dissolved in the liquid. The polymer additive may be 0.5-10% by weight of the additive solution, preferably 1-5% by weight of the additive solution. As one example, the liquid solution may consist of 1.33% (by weight) polyvinylpyrrolidone as the polymer additive and 98.67% n-methylpyrrolidone as the liquid carrier.

The operational flow of FIG. 2 may continue with a step 220 of mixing the additive solution (including the polymer additive and the liquid carrier) with an electrode active material to lubricate the active material surface. In the case of manufacturing an electrode for use in a lithium ion battery, the electrode active material may be, for example, lithium manganese oxide (LMO) in an amount 82-99% (e.g. 94%) by weight of the final mixture that is eventually pressed into a free-standing film (which may further include a binder and/or conductive material as described below). Other examples of active materials that may be used with the disclosed processes include manganese dioxide or other metal oxides, intercalated carbon, hard carbon, or activated carbon, depending on whether the electrode to be manufactured will be used in a battery, ultracapacitor, lithium ion capacitor, fuel cell, or hybrid cell, for example. The additive solution may be mixed with the electrode active material using any type of mixing tool, such as a hand mixer, a blender, a kitchen mixer, an industrial mixer, or a mill until the active material is lubricated by the additive solution uniformly. As noted above, the addition of the additive solution to the active material may add only a small amount of liquid, such that the resulting mixture remains powdery. Quantitatively, the additive solution may be less than 5% by weight of the final mixture, and the final mixture may have total solid contents greater than 95% by weight.

Once the electrode active material has been lubricated by the additive solution, a binder may be added and mixed in (step 230). The binder may be, for example, polytetrafluoroethylene (PTFE) or another thermoplastic polymer and may be in an amount 1-8% by weight of the final mixture, preferably less than 3% in the case of manufacturing an LMO electrode film for a battery. In some cases, the amount of binder needed may be further reduced by chemically activating the binder using a solvent as described in U.S. Pat. No. 10,069,131, which may cause the binder to soften further and become more able to stretch without breaking. The selected solvent for activating the binder may have a relatively low boiling point of less than 130° C. or less than 100° C. (i.e. less than the boiling point of water) and may, for example, include one or more chemicals selected from the group consisting of a hydrocarbon, an acetate ester, an alcohol, a glycol, ethanol, methanol, isopropanol, acetone, diethyl carbonate, and dimethyl carbonate.

Before or after the addition of the binder, a conductive material may also be added and mixed in (step 240), depending on the conductivity of the active material. The conductive material may be, for example, activated carbon in an amount 0-10% (e.g. 4%) by weight of the final mixture. Other example conductive materials are a conductive carbon black such as acetylene black, Ketjen black, or super P (e.g. a carbon black sold under the trade name SUPER P® by Imerys Graphite & Carbon of Switzerland), carbon nanotubes (CNT), graphite particles, a conducting polymer, and combinations thereof.

Referring back to FIG. 1, the operational flow may continue with a step 120 of subjecting the lubricated electrode active material mixture to a shear force. The mixture may, for example, be blended in a blender, such as an ordinary kitchen blender or an industrial blender. Adequate shear force to deform (e.g. elongate) the binder, resulting in a stickier, more pliable mixture, may be achieved by blending the mixture in such a blender at around 10,000 RPM for 1-10 min (e.g. 5 min). Preferably, a high-shear mixer may be used, such as a high-shear granulator (e.g. a jet mill). If the binder is to be chemically activated by a solvent as described above, the solvent may in some cases be injected into the mixture while the mixture is being subjected to the shear force in step 120.

After the mixture has been subjected to the shear force, the operational flow of FIG. 1 may continue with a step 130 of pressing the mixture to produce a free-standing film, for example, using a roller press (e.g. at a temperature of 150° C. and a roll gap of 20 μm). Owing to the lubrication of the active material mixture in step 110, the resulting film may be of high structural integrity despite having reduced binder content relative to conventional processes (e.g. less than 3% by weight of the free-standing electrode film in the case of manufacturing an LMO electrode film for a battery). The electrode film may thereafter be laminated on a current collector (e.g. copper or aluminum) to produce an electrode in step 140.

Figure 3:
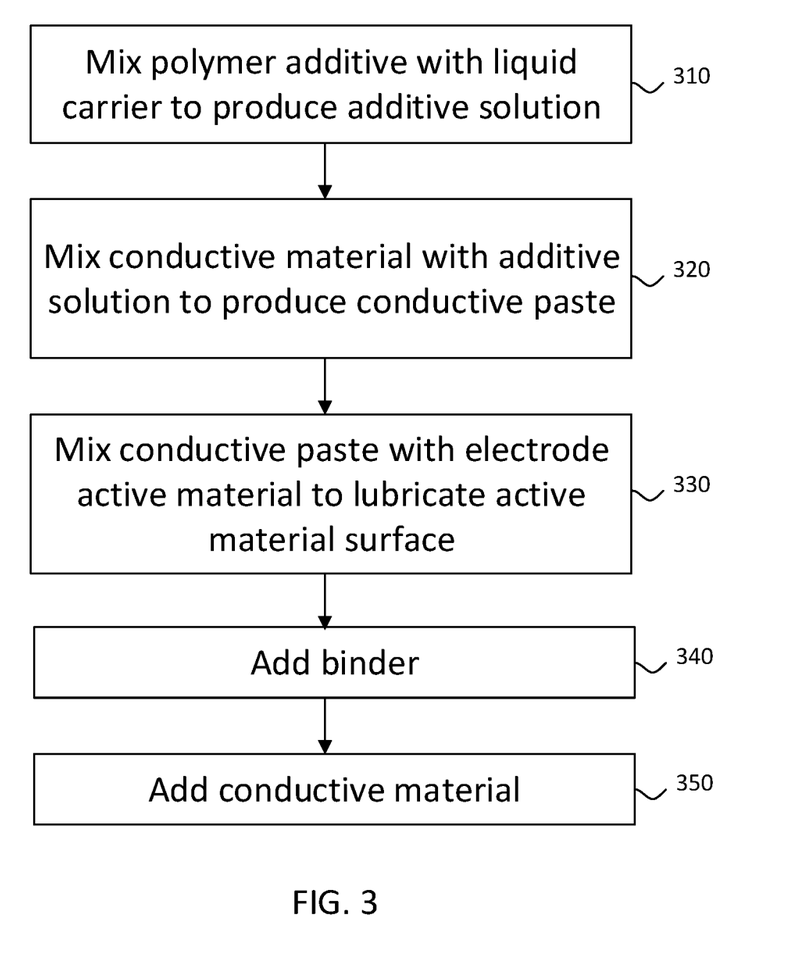
FIG. 3 shows another example sub-process of step 110 in FIG. 1.

FIG. 3 shows another example sub-process of step 110 of FIG. 1. In the example sub-process of FIG. 3, the active material mixture is lubricated by the addition of a conductive paste. First, in step 310, an additive solution may be produced in the same way as in step 210 of FIG. 2, by mixing a polymer additive with a liquid carrier until dissolved. The operational flow of FIG. 3 may then differ from FIG. 2 in the addition of a step 320 of mixing a conductive material with the additive solution, resulting in a conductive paste. The conductive material may be 1-20% by weight of the conductive paste, for example, preferably 2-15%, more preferably 5-10%, and may be mixed into the additive solution using a mill (e.g. in a wet milling process) or a high-shear mixer. Example conductive materials include those identified above in relation to step 240 of FIG. 2. The conductive paste may be, for example, a carbon nanotube (CNT) paste conventionally used to enhance electro-conductivity in a wet mixture used in a coating method as exemplified by U.S. Pat. No. 8,540,902. As one example, the conductive paste may consist of 3.08% (by weight) polyvinylpyrrolidone as the polymer additive, 91.67% n-methylpyrrolidone as the liquid carrier, and 6.25% carbon nanotube as the conductive materials. As explained above, the present disclosure contemplates the use of polymer additives contained in such a paste to lubricate a predominantly dry or powdery electrode active material mixture as part of a dry electrode manufacturing process.

The operational flow of FIG. 3 may continue with a step 330 of mixing the conductive paste (including the polymer additive, the liquid carrier, and the conductive material) with an electrode active material to lubricate the active material surface. The conductive paste may be mixed with the active material using the same methods and amounts as described in relation to mixing the additive solution with the active material in step 220 of FIG. 2. The addition of the conductive paste to the active material may similarly add only a small amount of liquid, such that the resulting mixture remains powdery.

Once the electrode active material has been lubricated by the conductive paste, the sub-process of FIG. 3 may continue with a step 340 of adding and mixing in a binder and, in some cases, a step 350 of adding and mixing in a second conductive material other than the conductive material included in the conductive paste. Steps 340 and 350 may be the same as steps 230 and 240 of FIG. 2. As in the case of the lubricated mixture produced by the sub-process of FIG. 2, the lubricated electrode active material mixture produced by the sub-process of FIG. 3 may be a dry, powdery mixture. In particular, the final mixture to be pressed into the free-standing electrode film (in step 130 of FIG. 1) may have total solid contents greater than 95% by weight, with the conductive paste being less than 5% by weight of the final mixture.

In the example sub-processes of FIGS. 2 and 3, a conductive material (if any) is added in step 240 or step 350 after the electrode active material has been mixed with the additive solution (step 220) or conductive paste (step 330). However, the disclosure is not intended to be so limited. In some cases, for example, the conductive material may be added to the active material before the active material is mixed with the additive solution or conductive paste.

As described above, the free-standing electrode film produced by the processes of FIGS. 1-3 may be of high quality, exhibiting good structural integrity despite the use of reduced binder as compared with conventional methods. The quality of a film may be quantified using a film rating system such as the film rating system shown in Table 1, below.

Crack," "Vertical Crack," "Flexibility," "Strength, "Holes") according to the respective weights of the categories. The higher the film quality score, the greater chance that the process used to manufacture the film will be scalable to mass production. In the example film rating system of Table 1, a minimum film quality score required for successful mass production may be 4.5, for example.

Experimental results of the above processes are shown in Tables 2-4 below. As shown in Table 2, Sample 1 is an LMO

TABLE 1

| Score | 0 | 1 | 2 | 3 | 4 | 5 | Wt. |
|---|---|---|---|---|---|---|---|
| Side Crack | Tiny pieces. Not a complete sheet | Side cracks after 1st press are larger than 7 cm. After trimming, final side cracks are larger than 5 cm. | Side cracks after 1st press are larger than 4 cm. After trimming, side cracks appear on 2nd and continue to grow with additional presses. Final side cracks are larger than 3 cm | During 1st press, side cracks are less than 3 cm. After trimming, side cracks appear during 3rd or 4th press but are less than 1 cm. | During 1st press, side cracks are less than 1 cm. After trimming, side cracks appear during 3rd or 4th press but are less than 0.5 cm. | During 1st press, side cracks are less than 1 cm. After trimming, no side appear with additional presses. | 20 |
| Vertical Crack | Tiny pieces. Not a complete sheet. | Splits during 1st press (either from the top or in the middle). Crack is larger than 10 cm. Film doesn't survive being pressed 4 times. | Splits during 2nd or 3rd press (either from the top or in the middle). Crack is larger than 10 cm. Film doesn't survive being pressed 4 times. | During 1st press, top cracks are less than 3 cm and middle cracks are less than 5 cm. After trimming film, no vertical top cracks appear until the 3rd press-they are less than 2.5 cm after 3rd press and less than 5 cm after 4th press. Middle cracks are less than 9 cm after final press. | During 1st press, top cracks are less than 2 cm and no cracks in middle. After trimming film, no vertical or middle cracks appear until the 4th press-they are less than 2.5 cm | During 1st press, top cracks are less than 1 cm and no cracks in middle. After trimming film, no additional vertical cracks appear. | 25 |
| Flexibility | Super brittle. Falls apart when you try to pick it up. Very difficult to handle. | Difficult to handle but can still be moved carefully using a file folder. | Breaks when moved in a wave. Can be handled carefully. | Won't break when loosely folded over or moved in a wave. Break when loosely rolled. Not too difficult to handle - file folder easy to slip under and transport film. | Able to be loosely folded and rolled. Survives being moved in a wave. Easy to handle. | Same as 4 but even easier to handle. Can be loosely rolled up several times without breaking. | 25 |
| Strength | Falls apart easily. Difficult to handle. | Gets holes when the micrometer is used or when you try to pick it up. Fails to be picked up either horizontally (by sides) or vertically (by top). Weak in both horizontal (when pulled from sides) and vertical (when pulled from top and bottom) directions. | Fails to be picked up either horizontally (by sides) or vertically (by top). Weak in both horizontal (when pulled from sides) or vertical (when pulled from top and bottom) directions. | Can be picked up from the top without breaking. Can be picked up from the sides without breaking. Strong in the vertical direction (being pulled apart from top to bottom), but weak in the horizontal direction (being pulled apart from side to side). | Can be picked up from the top without breaking. Can be picked up from the sides without breaking. Strong in the vertical direction (being pulled apart from top to bottom), passable strength in the horizontal direction (being pulled apart from side to side). | Strong in both the vertical and horizontal directions. Film can be picked up from the top without breaking. Can be picked up from the sides without breaking. | 25 |
| Holes (during 1st press) | A lot of holes. Not 1 sheet. | A lot of holes but still 1 sheet. | A few holes with less than 2 cm diameter. | 1 or 2 holes less than 1 cm diameter. | 1 or 2 holes less than 0.5 cm diameter. | No holes. | 5 |

Using the example film rating system of Table 1, a film quality score can be derived for a film by averaging the scores 1, 2, 3, 4, or 5 achieved in each category ("Side electrode made using a lubricated active material mixture that was prepared from an additive solution according to the sub-process of FIG. 2, and Sample 2 is an LMO electrode made using a lubricated active material mixture that was prepared from a conductive paste according to the sub-process of FIG. 3. Comparative Samples 1 and 2 were made without lubrication of the active material mixture.

TABLE 2

| Sample # | LMO (g) | Conductive Carbon (g) | Binder (g) | Additive Solution (g) | Conductive Paste (including Additive Solution) (g) |
|---|---|---|---|---|---|
| Comp. 1 | 92 | 4 | 4 | 0 | 0 |
| Comp. 2 | 92 | 5 | 3 | 0 | 0 |
| 1 | 94 | 4 | 2.3 | 2 | 0 |
| 2 | 94 | 4 | 2.1 | 0 | 2 |

Each of the films was evaluated according to the above film rating system of Table 1. The results are shown in Table 3, below.

TABLE 3

| Sample # | Side Crack | Vertical Crack | Flexibility | Strength | Holes | Weighted Average (Film Quality) |
|---|---|---|---|---|---|---|
| Comp. 1 | 3 | 3 | 2 | 4 | 1 | 2.9 |
| Comp. 2 | 3 | 2 | 3 | 3 | 2 | 2.85 |
| 1 | 4.3 | 4.4 | 4.8 | 4.2 | 5 | 4.46 |
| 2 | 4.7 | 4.7 | 4.5 | 4.5 | 5 | 4.62 |

As can be seen, even with less binder being used in Samples 1 and 2, the film quality is significantly improved by the use of a lubricated electrode active material mixture as described herein.

The bulk resistivity of each of the films was measured, and the electrodes made using the films were tested to determine their discharge characteristics. The results are shown in Table 4, below.

TABLE 4

| Sample # | Bulk Resist. (Ω-cm) | $1^{st}$ Dis. Cap. (mAh/g) | Effi. (%) | $2^{nd}$ Dis. Cap. (mAh/g) | 0.1 C | 0.33 C | 0.5 C (mAh/g) | 1 C | 2 C |
|---|---|---|---|---|---|---|---|---|---|
| Comp. 1 | 245.89 | 101.7 | 93 | 102.1 | 101.8 | 100.9 | 99.5 | 91.5 | 48.5 |
| Comp. 2 | 32.38 | 102.9 | 94 | 103.3 | 102.8 | 102.2 | 100.5 | 75.3 | 35.6 |
| 1 | 20.25 | 105.9 | 94 | 105.7 | 102.6 | 105.3 | 104.9 | 100.5 | 77.6 |
| 2 | 6.28 | 104.6 | 95 | 105.6 | 105.5 | 105 | 104.1 | 99 | 58.3 |

As can be seen, Samples 1 and 2 exhibited higher discharge capacity and equivalent or higher first cycle efficiency (higher in the case of Sample 2). C rate was also higher for Samples 1 and 2, with nominal capacity at 0.33 C, 1 C, and 2 C (and 0.1 C in the case of Sample 2) increased relative to the comparative samples.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of manufacturing a free-standing electrode film, the method comprising:
   preparing a mixture including an electrode active material, polytetrafluoroethylene (PTFE), and an additive solution, the additive solution being in an amount less than 5% by weight of the mixture and including a polymer additive and a liquid carrier, the mixture having total solid contents greater than 95% by weight, said preparing comprising mixing the additive solution with the electrode active material to lubricate the electrode active material and subsequently adding the PTFE;
   subjecting the mixture to a shear force; and,
   after the mixture has been subjected to the shear force, pressing the mixture into a free-standing film.

2. The method of claim 1, further comprising mixing the polymer additive with the liquid carrier to produce the additive solution.

3. The method of claim 1, wherein the polymer additive is 0.5-10% by weight of the additive solution.

4. The method of claim 3, wherein the polymer additive is 1-5% by weight of the additive solution.

5. The method of claim 1, wherein the mixture further includes a conductive material, said preparing comprising mixing the additive solution with the electrode active material to lubricate the electrode active material and subsequently adding the PTFE and the conductive material.

6. The method of claim 1, wherein said pressing includes applying a roller press to the mixture.

7. A method of manufacturing an electrode, the method comprising:
   the method of claim 1; and
   laminating the free-standing film on a current collector.

8. A method of manufacturing a free-standing electrode film, the method comprising:

preparing a mixture including an electrode active material, polytetrafluoroethylene (PTFE), and a conductive paste, the conductive paste being in an amount less than 5% by weight of the mixture and including a polymer additive, a liquid carrier, and a conductive material, the mixture having total solid contents greater than 95% by weight, said preparing comprising mixing the conductive paste with the electrode active material to lubricate the electrode active material and subsequently adding the PTFE;

subjecting the mixture to a shear force; and, after the mixture has been subjected to the shear force, pressing the mixture into a free-standing film.

9. The method of claim 8, further comprising mixing the polymer additive, the liquid carrier, and the conductive material to produce the conductive paste.

10. The method of claim 9, wherein said mixing the polymer additive, the liquid carrier, and the conductive material to produce the conductive paste comprises mixing the polymer additive and the liquid carrier to produce an additive solution and, thereafter, mixing the conductive material into the additive solution.

11. The method of claim 10, wherein the polymer additive is 0.5-10% by weight of the additive solution.

12. The method of claim 11, wherein the polymer additive is 1-5% by weight of the additive solution.

13. The method of claim 8, wherein the conductive material is 1-20% by weight of the conductive paste.

14. The method of claim 13, wherein the conductive material is 2-15% by weight of the conductive paste.

15. The method of claim 14, wherein the conductive material is 5-10% by weight of the conductive paste.

16. The method of claim 8, wherein the mixture further includes a second conductive material other than the conductive material included in the conductive paste, said preparing comprising mixing the conductive paste with the electrode active material to lubricate the electrode active material and subsequently adding the PTFE and the second conductive material.

17. The method of claim 8, wherein said pressing includes applying a roller press to the mixture.

18. A method of manufacturing an electrode, the method comprising:

the method of claim 8; and laminating the free-standing film on a current collector.

19. A powdery mixture for use in manufacturing a free-standing electrode film, the powdery mixture comprising:

an electrode active material;

polytetrafluoroethylene (PTFE); and an additive solution in an amount less than 5% by weight of the powdery mixture, the additive solution including a polymer additive and a liquid carrier, wherein the powdery mixture has total solid contents greater than 95% by weight.

20. The powdery mixture of claim 19, further comprising a conductive material.

21. The powdery mixture of claim 19, wherein the polymer additive is 0.5-10% by weight of the additive solution.

* * * * *